United States Patent [19]

Oxford

[11] Patent Number: 5,303,945
[45] Date of Patent: Apr. 19, 1994

[54] ATTACHMENT FOR A WHEELCHAIR

[76] Inventor: Stuart G. Oxford, 13616 N. 78th St., Omaha, Nebr. 68122

[21] Appl. No.: 958,282

[22] Filed: Oct. 7, 1992

Related U.S. Application Data

[63] Continuation-in-part of Ser. No. 669,507, Mar. 14, 1991, which is a continuation-in-part of Ser. No. 594,343, Oct. 9, 1990, Pat. No. 5,149,118, which is a continuation-in-part of Ser. No. 439,612, Nov. 20, 1989, Pat. No. 5,020,818, which is a continuation-in-part of Ser. No. 263,417, Oct. 27, 1988, Pat. No. 4,892,323.

[51] Int. Cl.⁵ .......................... A61G 5/02; B62M 1/16
[52] U.S. Cl. ................................. 280/304.1; 280/244; 280/253; 280/250.1
[58] Field of Search ................. 280/250.1, 254.1, 244, 280/266, 253, 288.4

[56]                References Cited
U.S. PATENT DOCUMENTS 4,358,126  11/1982  Mitchell et al. ................. 280/250.1
5,020,818   6/1991  Oxford ............................ 280/304.1

Primary Examiner—Mitchell J. Hill
Attorney, Agent, or Firm—Zarley, McKee, Thomte, Voorhees & Sease

[57]            ABSTRACT

An attachment is provided which may be mounted on a conventional wheelchair to enable the conventional wheelchair to traverse a regular terrain. The attachment comprises a pair of wheel drive assemblies which are mounted to the rear wheels of the wheelchair. Each of the wheel drive assemblies comprises inner and outer plates which embrace the inner and outer surfaces of the wheel and which are interconnected by means of bolts. The nut or bolt head is positioned outwardly of the outer surface of the outer plate and has a ratchet wrench mounted thereon. A hollow pipe embraces the upper end of the ratchet wrench and extends upwardly therefrom. An inverted U-shaped member has its opposite ends rotatably received by the upper ends of the hollow pipes.

3 Claims, 6 Drawing Sheets

ATTACHMENT FOR A WHEELCHAIR

Cross Reference to Related Application

This is a continuation-in-part application of U.S. Ser. No. 07/669,507 filed Mar. 14, 1991 pending which is a continuation-in-part application of U.S. Ser. No. 594,343 filed Oct. 9, 1990 which issued as U.S. Pat. No. 5,149,118 which is a continuation-in-part application of U.S. Ser. No. 439,612 filed Nov. 20, 1989 which issued as U.S. Pa. No. 5,020,818 which is a continuation-in-part application of U.S. Ser. No. 263,417 filed Oct. 27, 1988 which issued as U.S. Pat. No. 4,892,323.

Background of the Invention

This invention relates to a wheelchair and more particularly to an attachment for a wheelchair to enable the wheelchair to traverse irregular terrain.

The conventional wheelchair is comprised of two large diameter, ground-engaging, narrow width, pneumatic rear wheels mounted on an axle positioned beneath the seat of the chair with smaller diameter, narrow width, pneumatic, ground-engaging wheels posited forwardly of the rear wheels. The front wheels are pivotally mounted to vertical stanchions and generally are not able to be locked in any particular angular position. The occupant of the wheelchair is seated in a conventional fashion such that the lower portion of the occupant's legs will be generally perpendicular to the ground.

The operator of the conventional-type wheelchair, when using the wheelchair off-road, is faced with a number of problems. The conventional wheelchair also faces difficulties when traversing uneven surfaces or negotiating obstructions in the path. One difficulty is in being unable to proceed any further when a wheel becomes stuck in a depression. A similar problem, with the same consequences, occurs when attempting to traverse obstructions—rocks, logs or other curbs—in the pathway.

The attachment disclosed in the co-pending application, Ser. No. 669,507 did result in a much improved wheelchair capable of overcoming many of the disadvantages of the prior art wheelchairs. It has been found that a less expensive attachment could be provided than that disclosed in the co-pending application and which requires no modification of the existing wheelchair.

It is therefore a principal object of the invention to provide an attachment for a conventional wheelchair which permits the wheelchair to traverse irregular services.

A further object of the invention is to provide an attachment for a conventional wheelchair to convert the wheelchair to an all-terrain wheelchair.

A further object of the invention is to provide an attachment for a conventional wheelchair which enables the wheelchair to traverse uneven terrain.

Yet another object of the invention is to provide an attachment for a wheelchair which may be mounted thereon without modifying the wheelchair.

Still another object of the invention is to provide an attachment for a wheelchair including ratchet wrenches associated therewith wherein the actuating levers for the wrenches have extensions mounted thereon to enable the user of the invention to shift the actuating levers on the wrenches.

Still another object of the invention is to provide an attachment for a wheelchair which is easily secured thereto and which is safe to use.

These and other objects of the present invention will be apparent to those skilled in the art.

Summary of the Invention

The attachment of this invention comprises a pair of wheel drive assemblies which are removably secured to the rear wheels of the wheelchair. Each of the rear wheel drive assemblies comprises inner and outer plates which are positioned on opposite sides of the associated rear wheel. The inner and outer plates are connected together by bolts extending through the spokes. A bolt head is secured to the outer plate forwardly of the outer end of the wheel axle and has a ratchet wrench mounted thereon. An elongated hollow pipe embraces the ratchet wrench and extends upwardly therefrom. An inverted U-shaped member is secured to the upper ends of the upwardly extending pipes so that the pipes may be moved by pushing on the central portion of the inverted U-shaped member or by pushing on one of the legs of the inverted U-shaped member. An extension is mounted on the actuating lever of the ratchet wrench so that the occupant of the wheelchair may readily and easily shift the actuating lever.

Description of the Preferred Embodiment

Figure 1:
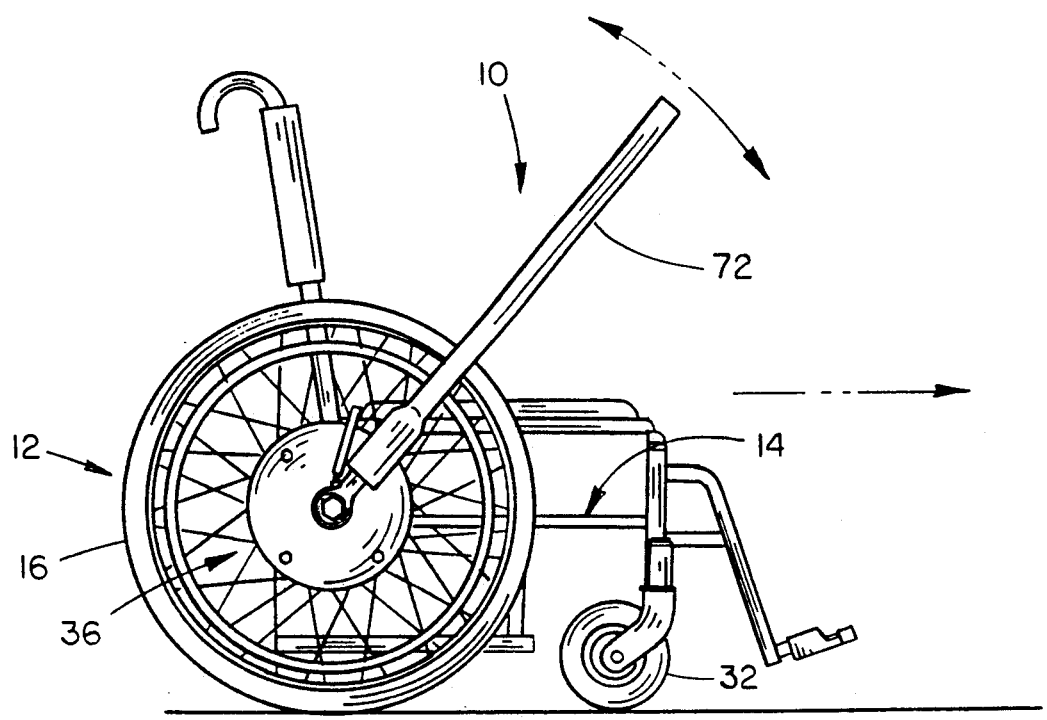
FIG. 1 is a side view of a wheelchair having the attachment mounted thereon.
Figure 2:
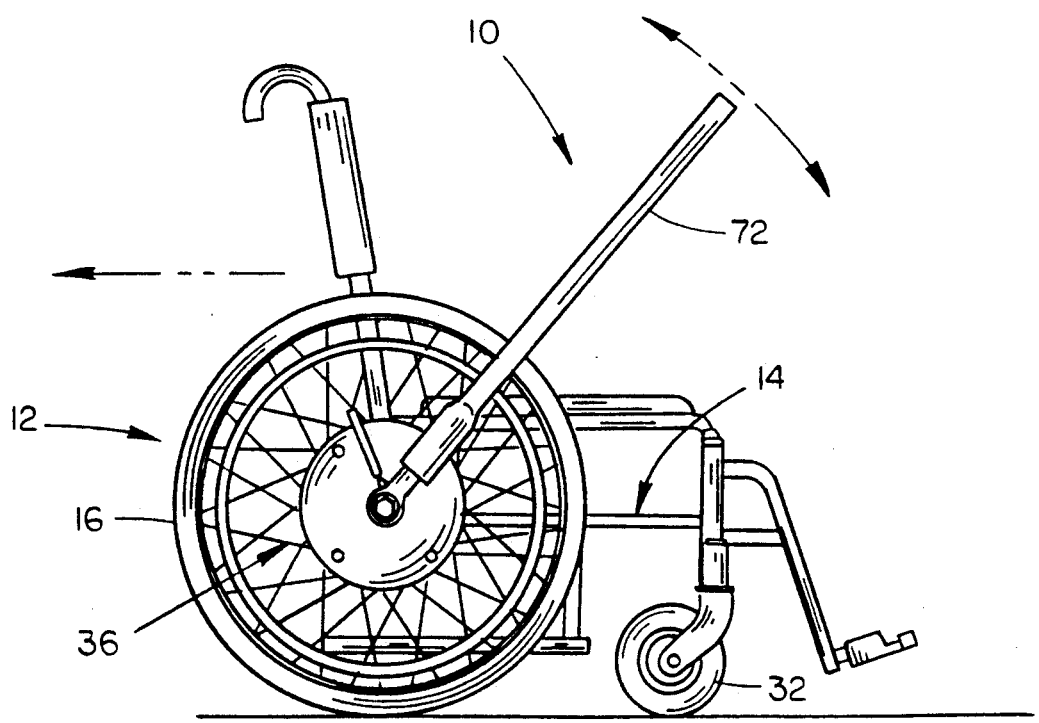
FIG. 2 is a view similar to FIG. 1 except that the wheelchair is being driven rearwardly.
Figure 3:
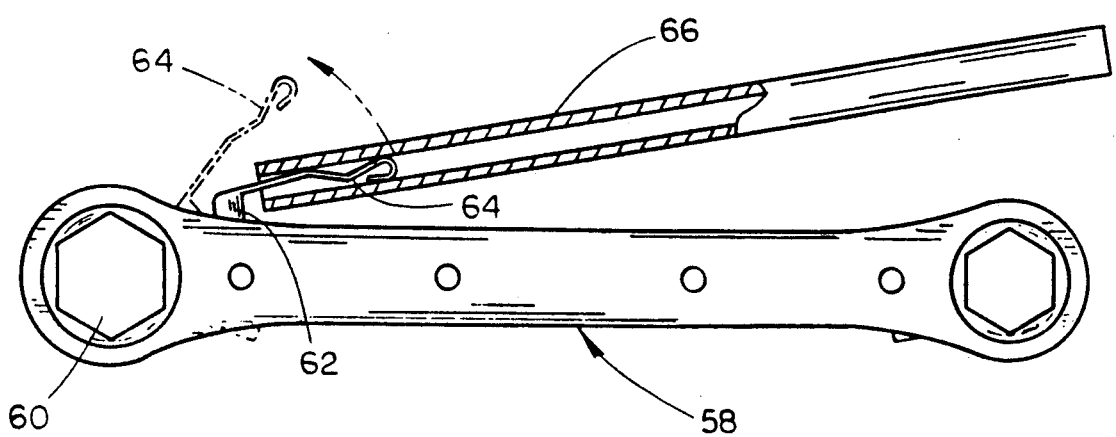
FIG. 3 is a side view of one of the ratchet wrenches having the extension mounted thereon with the extension being partially broken away to more fully illustrate the invention.
Figure 4:
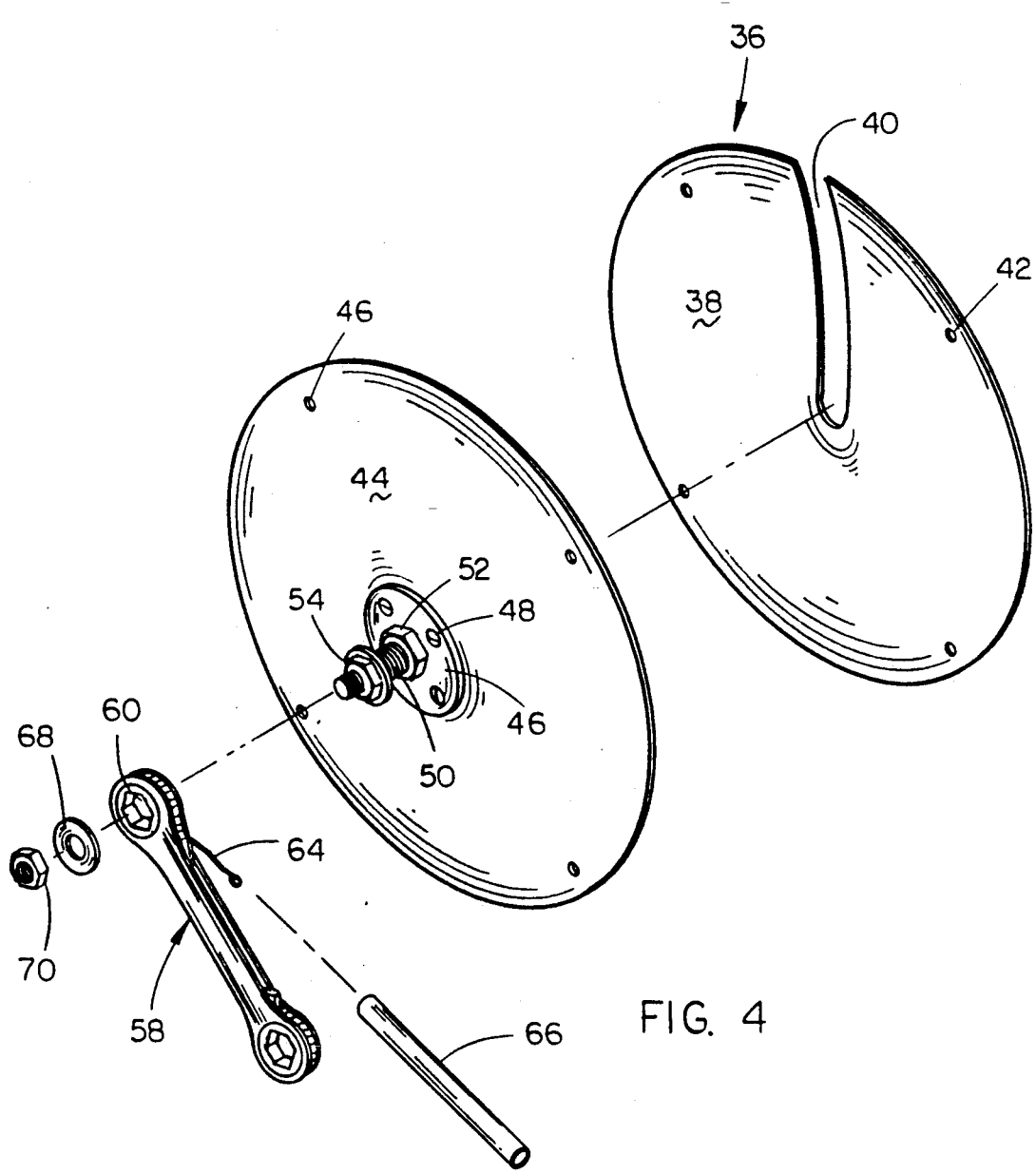
FIG. 4 is an exploded perspective view of one of the five assemblies.
Figure 6:
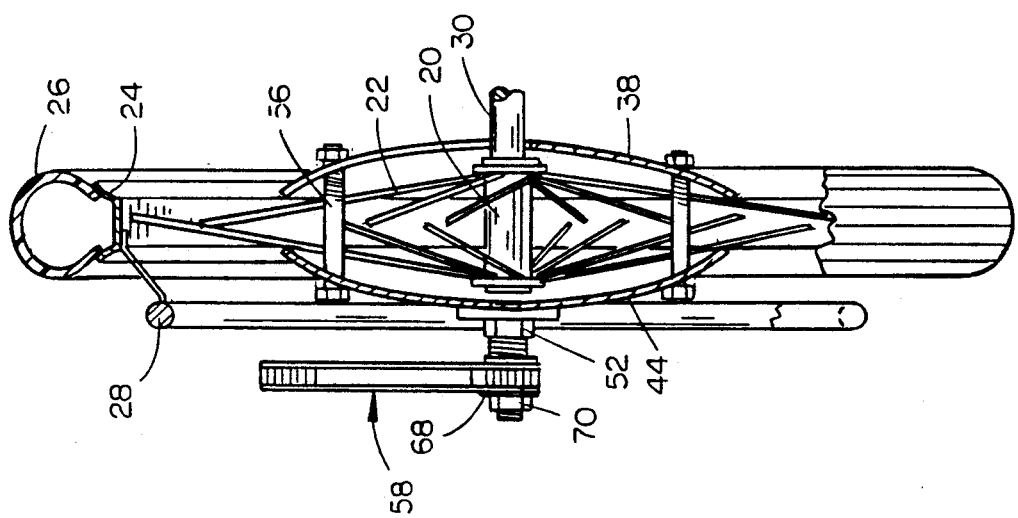
FIG. 6 is partial sectional view illustrating one of the drive assemblies mounted on a rear wheel of the wheelchair.
Figure 5:
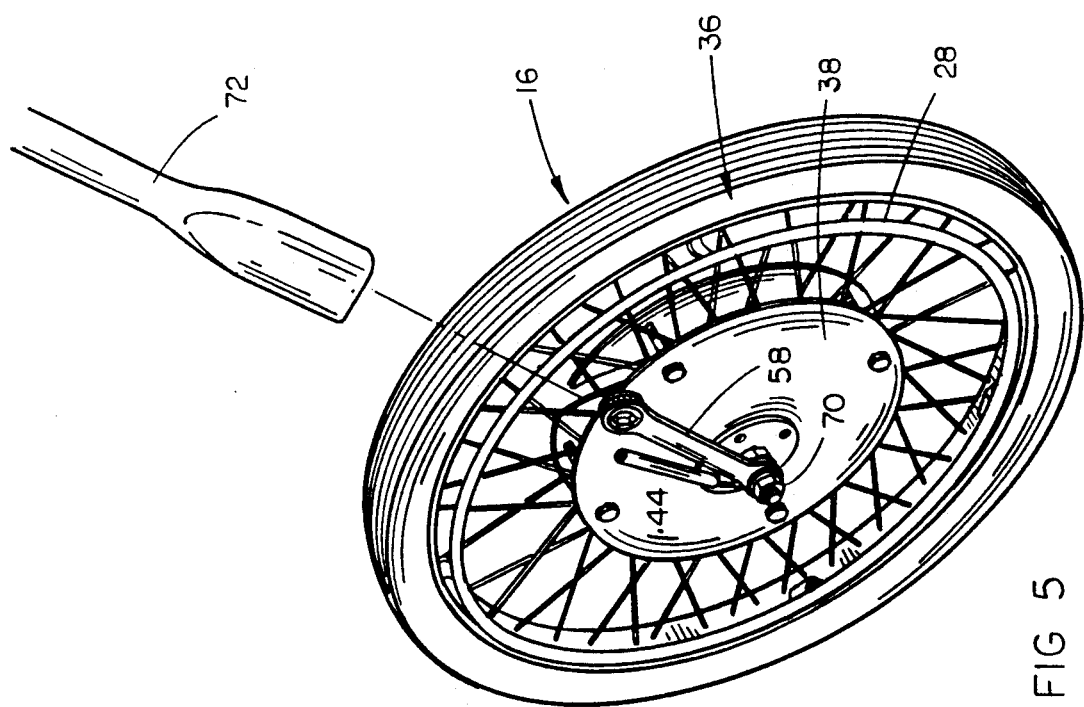
FIG. 5 is a perspective view illustrating one of the drive attachments mounted on one of the rear wheels of the wheelchair.

The attachment of this invention is referred to genera the reference numeral 10 while the reference numeral 12 refers to a conventional wheelchair. Wheelchair 12 includes a frame 14 having a pair of rear wheels 16 and 18 rotatably mounted at the rearward end thereof. Each of the wheels 16 and 18 includes a hub 20 having a plurality of spokes 22 extending therefrom to a rim 24 having a tire 26 mounted thereon in conventional fashion. Each of the wheels 16 and 18 also includes a ring member 28 which is normally used to propel the wheel. As seen in FIG. 6, hub 20 is mounted on the outer end of axle 30. Wheelchair 12 also includes a pair of front wheels 32 and 34 which are pivotally and rotatably mounted on the frame 14. All of the structure of the wheelchair described heretofore is conventional.

Attachment 10 includes a pair of wheel drive assemblies 36 and 36' and are selectively removably secured to each of the wheels 16 and 18 for propelling the wheel 16 and 18 in either a forwardly or rearwardly direction. Inasmuch as each of the wheel drive assemblies 36 and 36' are identical, only wheel drive assembly 36 will be described in detail with "prime marks" indicating identical structure on wheel drive assembly 36'.

Wheel drive assembly 36 includes an inner plate 38 which is positioned adjacent the inner surface of the wheel 16 and which has a slot 40 formed therein for reception of the axle 30. Inner plate 38 is provided with a plurality of bolt openings 42 formed therein. Assembly 36 also includes an outer plate having a plurality of bolt openings 46 formed therein. Plate 46 is secured to plate 44 by bolts or screws 48 and has a threaded bolt 50 secured thereto and extending horizontally outwardly therefrom. Bolt head 52 is mounted on the inner end of the bolt 50. Retaining nut 54 is mounted on the outer end of bolt 50.

Plates 38 and 44 are secured to opposite sides of wheel 16 by means of the bolts 56 extending through the openings 46 and 42. The numeral 58 refers to a conventional ratchet wrench of the box-end type having a rotatably member 60 at one end thereof which is adapted to receive the head of nuts in conventional fashion. The conventional ratchet wrench 58 includes an actuating lever 62 to permit the wrench 58 to rotate nuts in the desired direction. It has been found that the small size of the actuating lever 62 makes it extremely difficult for a handicapped person to operate the lever to control the operation of the wrench. Thus, a wire 64 is welded to the outer end of the actuating lever 62. A tubular extension 66 is then slipped over the wire 64 so that the occupant of the wheelchair may pivot the lever 62 to its desired position.

Wrench 58 is mounted on the nut 54 and is held in place by means of the washer 68 and nut 70. Thus, depending upon the position of the actuating lever 62, wrench 58 may be employed to drive or rotate the nut 54 in opposite directions to propel the rear wheel 16 in either a forwardly or rearwardly direction. It can be seen that the eye wheel attachment 36 is easily mounted on the wheel 16 without any modification of the wheel 16. A pipe 72 embraces the upper end of ratchet wrench 58 and extends upwardly therefrom. Similarly, pipe 72 embraces the upper end of ratchet wrench 58' and extends upwardly therefrom. The occupant of the wheelchair may push forwardly or pull rearwardly on the pipe 72 and 72' to propel the wheelchair. The pipe 72 and 72, enable the occupant of the wheelchair to exert sufficient force on the ratchet wrenches 58 and 58' to propel the wheelchair over irregular terrain and up steep inclines.

Figures 7, 8:
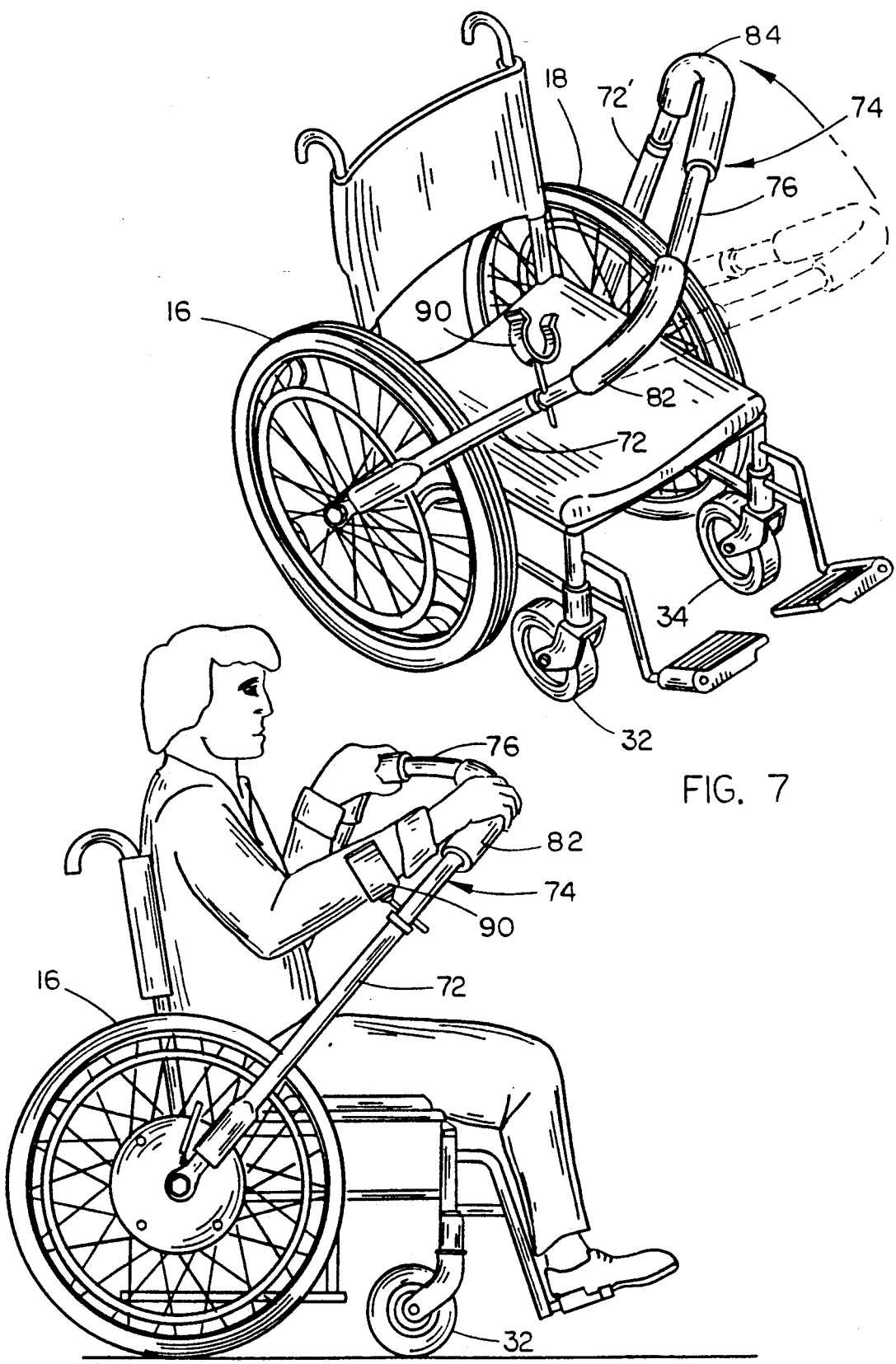
FIG. 7 is a front perspective view illustrating the manner in which the inverted U-shaped member may be employed to drive either of the drive assemblies.
FIG. 8 is a side view illustrating the inverted U-shaped member being employed to drive the wheelchair.
Figure 9:
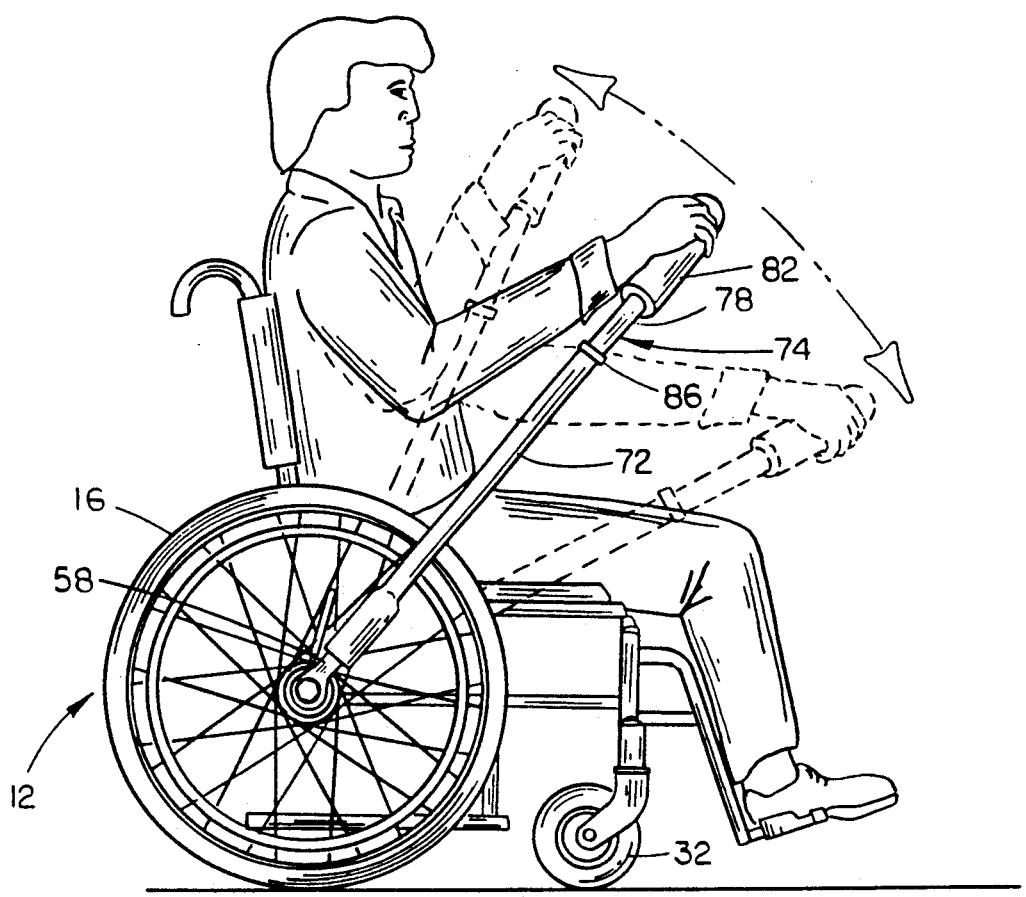
FIG. 9 is a view similar to FIG. 8.
Figure 10:
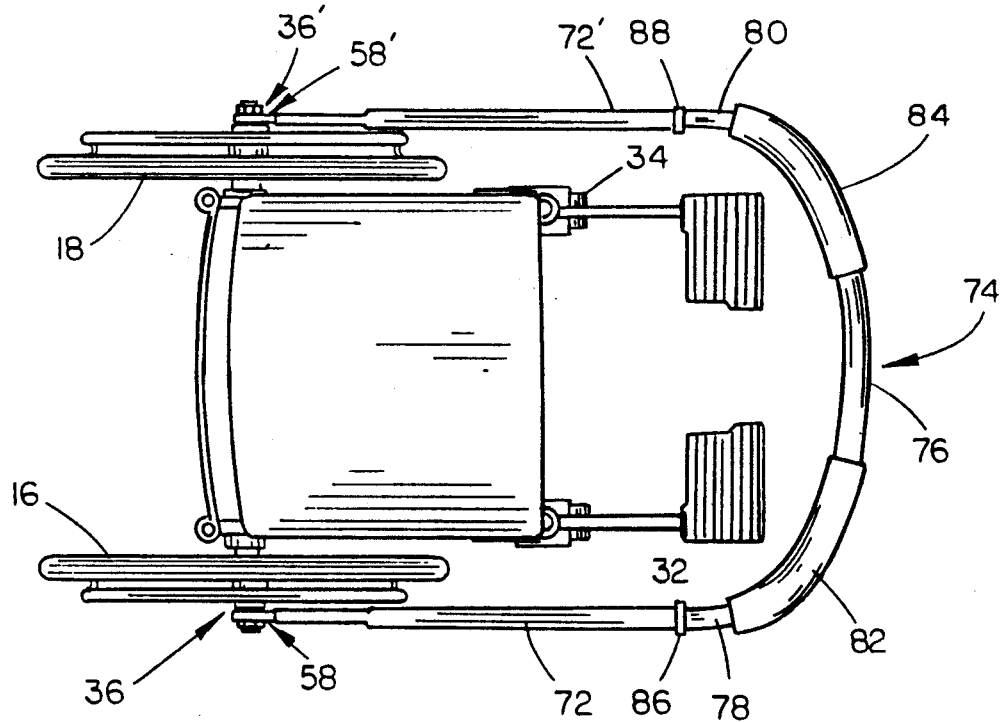
FIG. 10 is a top view of the wheelchair.
Figure 11:
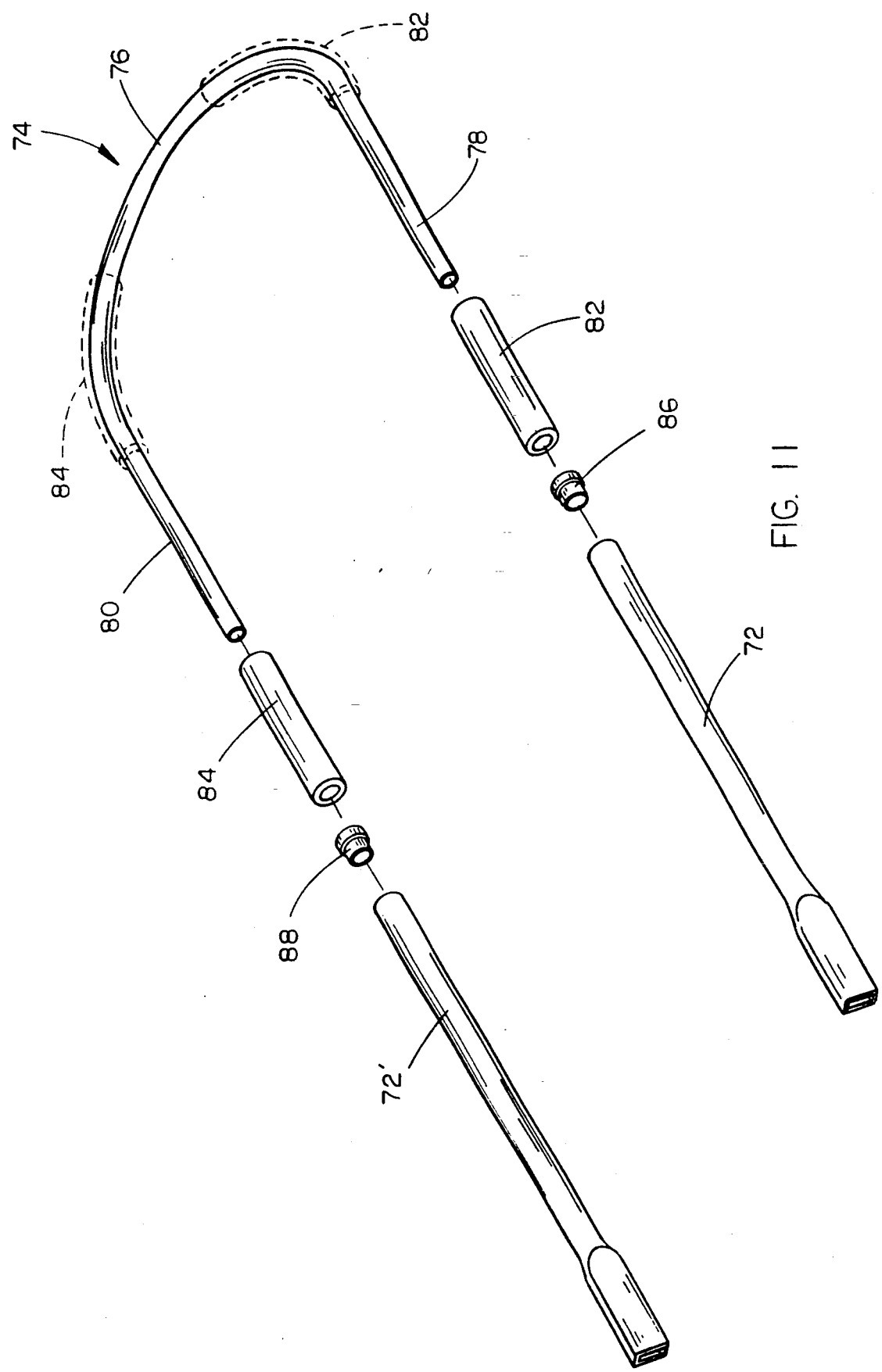
FIG. 11 is an exploded perspective view of the pipes and the inverted U-shaped member mounted therein.

Although the pipes 72 and 72' normally provide sufficient force for driving the wheelchair, it has been found that certain wheelchair users require additional assistance. To that end, an inverted U-shaped member 74 is utilized. Preferably, member 74 is constructed of a flexible plastic material or the like. For purposes of description, the inverted U-shaped member 74 will be described as comprising a base 76 and legs 78 and 80. Legs 78 and 80 are adapted to be received in the upper ends of the pipes 72 and 72' respectively. Cushions 82 and 84 may embrace the member 76 to provide cushions for the user. Although not required, collars 86 and 88 may be inserted into the upper ends of the pipes 72 and 72' to aid in the positioning of the legs 78 and 80 therein. For convenience, arm support 90 may also be secured to the U-shaped member 74 as illustrated in FIG. 8. Thus, the occupant of the wheelchair, as illustrated in Figure 9, may move the inverted U-shaped member upwardly and downwardly to propel the wheelchair. The flexible characteristics of the inverted U-shaped member 74 also enables the occupant to propel either of the wheels 16 and 18 without propelling the other wheel. Such movement is also enhanced by the fact that the legs 78 and 80 are rotatably received by the upper ends of the pipes 72 and 72,. Further, inverted U-shaped member 74 permits a person to operate both wheels even though that person may only have the use of one arm. In such a case, the user would simply grasp the center portion of the base 68 and would therefore be able to move both the pipes 72 and 72, by exerting force on the U-shaped member 74.

Thus is can be seen that a novel attachment has been provided for a wheelchair which enables the wheelchair to be utilized on rough or irregular terrain. The attachment of this invention may be easily attached to an existing wheelchair without modification of the same. Further, the attachment of this invention enables the wheelchair user to propel the wheelchair even though the user may have only the use of one arm. Thus, it can be seen that the invention accomplishes at least all of its stated objectives.

I claim:

1. In combination with a wheelchair including a frame, a pair of axles on the frame, a rear wheel operatively rotatably mounted on each of the axles, a pair of front wheels operatively rotatably and pivotally mounted on the frame, a seat on said frame between the rear wheels, and a foot rest positioned at the forward end of the frame, comprising, a first wheel drive assembly operatively secured to one of said rear wheels and having a first bolt head means provided thereon which is positioned horizontally outwardly of the axle for the wheel, the rotation of said first bolt head means causing said first wheel drive assembly to rotate said one wheel, a second wheel drive assembly operatively secured to the other of said rear wheels and having a second bolt head means provided thereon which is positioned horizontally outwardly of the axle for the wheel, the rotation of said second bolt head means causing said second wheel drive assembly to rotate said other wheel, a first ratchet wrench operatively secured to said first bolt head means for selectively rotating said first bolt head means so that said one rear wheel may be driven either forwardly or rearwardly, a second ratchet wrench operatively secured to said second bolt head means for selectively rotating said second bolt head means so that said other rear wheel may be driven either forwardly or rearwardly, a first elongated hollow pipe secured to said first ratchet wrench and extending upwardly therefrom, whereby the person in the wheelchair may grasp the same, a second elongated hollow pipe secured to said second ratchet wrench and extending upwardly therefrom, whereby the person in the wheelchair may grasp the same, and an inverted U-shaped member, having first and second legs and a base portion interconnecting the first and second legs, the legs of said inverted U-shaped member being received by the upper ends of said first and second pipes so that moving the U-shaped member when connected to the first and second pipes acts as a means of propelling the wheelchair.

2. The combination of claim 1 wherein said legs are rotatably received by said pipes so that one of said legs and the associated pipe, may be moved either forwardly or rearwardly without moving the other leg and pipe.

3. In combination with a wheelchair including a frame, a pair of axles on the frame, a rear wheel operatively rotatably mounted on each of the axles, a pair of front wheels operatively rotatably and pivotally mounted on the frame, a seat on said frame between the rear wheels, and afoot rest positioned at the forward end of the frame, comprising, a first wheel drive assembly operatively secured to one of said rear wheels and having a first bolt head means provided thereon which is positioned horizontally outwardly of the axle for the wheel, the rotation of said first bolt head means causing said first wheel drive assembly to rotate said one wheel, a second wheel drive assembly operatively secured to the other of said rear wheels and having a second bolt head means provided thereon which is positioned horizontally outwardly of the axle for the wheel, the rotation of said second bolt head means causing said second wheel drive assembly to rotate said other wheel, a first ratchet wrench operatively secured to said first bolt head means for selectively rotating said first bolt head means so that said one rear wheel may be driven either forwardly or rearwardly, and a second ratchet wrench operatively secured to said second bolt head means for selectively rotating said second bolt head means so that said other rear wheel may be driven either forwardly or rearwardly, each of said first and second drive wheel assemblies being selectively removably mounted on said rear wheels, each of said rear wheels including a hub mounted on the associated axle, spokes extending outwardly from said hub to a rim, and a tire mounted on the rim, and each of said drive wheel assemblies comprising inner and outer plates positioned on opposite sides of the rear wheel, and bolts extending through the spokes which interconnect said inner and outer plates.

* * * * *